(12) United States Patent
Baumgärtl et al.

(10) Patent No.: US 6,279,115 B1
(45) Date of Patent: Aug. 21, 2001

(54) CIRCUIT ARRANGEMENT FOR MONITORING OF AN ELECTRIC TRIPPING DEVICE FOR LOW-VOLTAGE SWITCHES

(75) Inventors: Ulrich Baumgärtl; Wolfgang Röhl, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,198
(22) PCT Filed: Aug. 29, 1997
(86) PCT No.: PCT/DE97/01946
  § 371 Date: Jun. 22, 1999
  § 102(e) Date: Jun. 22, 1999
(87) PCT Pub. No.: WO98/09360
  PCT Pub. Date: Mar. 5, 1998

(30) Foreign Application Priority Data

Aug. 30, 1996 (DE) ................................ 196 36 338

(51) Int. Cl.[7] ................ G06F 1/26; G06F 1/28; G06F 1/30
(52) U.S. Cl. .......... 713/300; 713/310; 713/320; 713/321; 713/322; 713/323; 713/324; 713/330; 713/340; 702/64; 361/96; 361/97; 361/93.1; 361/94

(58) Field of Search .................... 713/300–340; 702/64; 361/96, 97, 93, 94

(56) References Cited

U.S. PATENT DOCUMENTS 4,593,380 * 6/1986 Kocher et al. .
5,159,519 * 10/1992 Cassidy et al. .................... 361/96

* cited by examiner

*Primary Examiner*—Rypal Dharia
(74) *Attorney, Agent, or Firm*—Kenyon & Kenyon

(57) ABSTRACT

A circuit arrangement is described for monitoring an electronic tripping device for low-voltage switches having a microprocessor device which, in conjunction with a digital-analog converter, evaluates an overcurrent so that line power supply system. The microprocessor device (MPE) has a zero crossing comparator with which a constant test current pulse is transmittable, at zero crossings, to the electronic tripping device via an additional current transformer winding to measure the amplitude. In the case of deviations from the setpoint value, (re)calibration or actuation of the line tripping contacts, with an alarm signal being emitted, takes place.

5 Claims, 1 Drawing Sheet

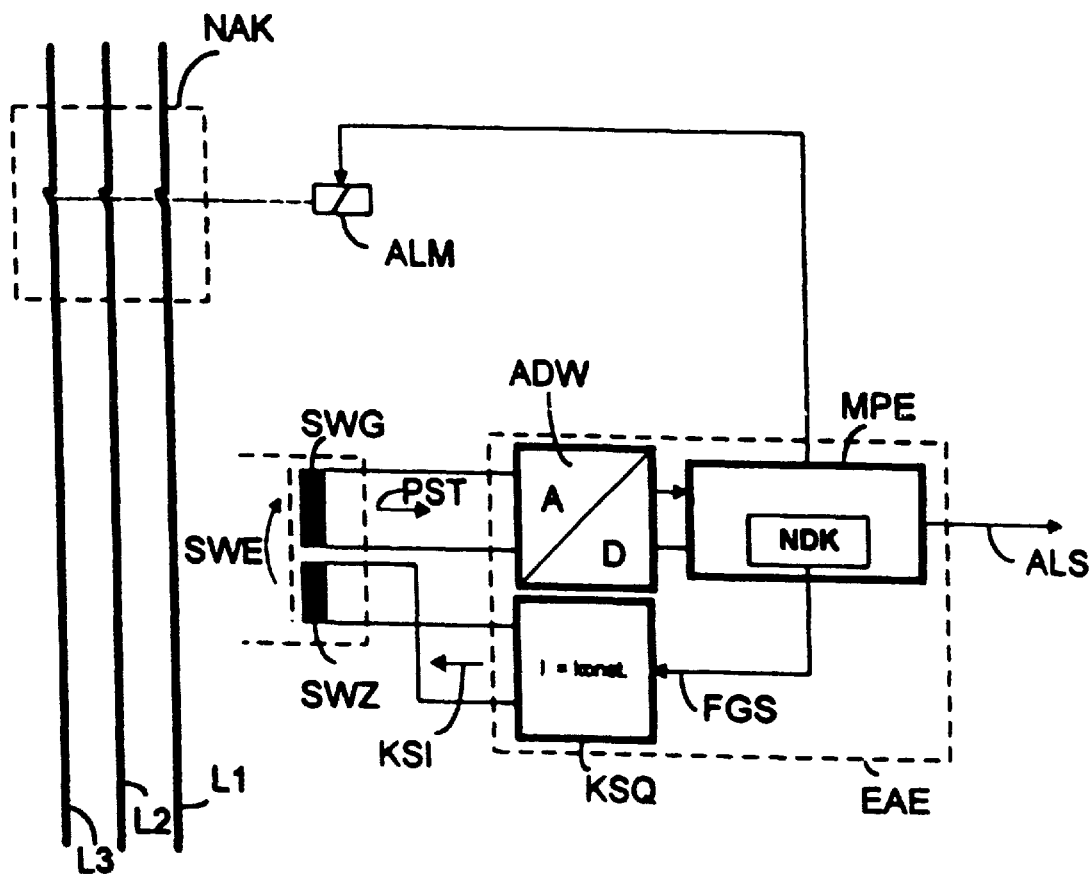

CIRCUIT ARRANGEMENT FOR MONITORING OF AN ELECTRIC TRIPPING DEVICE FOR LOW-VOLTAGE SWITCHES

FIELD OF THE INVENTION

The present invention relates to a circuit arrangement for monitoring an electronic tripping device for low-voltage switches having a microprocessor device which, in conjunction with a digital-analog converter, evaluates an overcurrent so that line tripping contacts shut off the lines to be protected from the power supply system.

BACKGROUND OF THE INVENTION

A circuit arrangement of the above-defined type is described in German Patent No. 31 53 169. Deterioration of the current transformers or the electronic tripping devices and their power supply lines cannot be detected with this circuit arrangement. If under such conditions the circuit breaker fails to trip in a timely manner in the case of a short circuit or an overload, this may cause considerable material damage in the electrical system and even serious personal injuries. Initial calibration of tripping devices has been traditionally performed in a test bay. Subsequent testing of the installed current transformers has been difficult.

SUMMARY

An object of the present invention is to monitor electronic tripping devices with the associated switching means, i.e., including the current transformers with their power supply conductors, as thoroughly as possible for operability, in particular also during operation.

According to the present invention, this object is achieved through the following features:

1.1 the microprocessor device of the electronic device is equipped with a zero crossing comparator;

1.2 the zero crossing comparator generates an enable signal at zero crossing of the the line alternate current;

1.3 the enable signal is connected to a switchable constant current source so that a constant current pulse induces an evaluatable test current in the electronic tripping device via an additional current transformer winding;

1.4 the microprocessor device has an analog-digital converter, which converts the test current for amplitude measurement;

1.5 in the case of an allowable tolerance deviation of the test current, the microprocessor device (re)calibrates the electronic tripping device;

1.6 in the case of an unallowable tolerance deviation of the test current, the microprocessor device generates an alarm signal to actuate the line tripping contacts.

By providing a zero crossing comparator within the microprocessor device, the enable signal can be transmitted to the switchable constant current source at zero crossings of the line AC, so that with the subsequent constant current pulse a test current is induced in the electronic tripping device via the additional winding of the current transformer. This test current, which depends on the electrical parameters of the voltage transformer, is measured in the microprocessor device for its amplitude and compared with a predefined setpoint value. If the deviation from the setpoint value, which represents the regular status of the current transformer, is relatively small, the circuit can optionally be switched to (re)calibration of the electronic tripping device. If the setpoint value is exceeded in an unallowable manner, the microprocessor device triggers the line tripping contacts to isolate the lines monitored from the supply system and generates, at the same time, an alarm signal for the control room.

An advantageous embodiment of the present invention provides the following feature:

2.1 the additional current transformer winding is electrically coupled to a secondary current transformer winding.

Thus the constant current pulse can be advantageously adjusted to the different electrical conditions of the electronic tripping devices.

Another advantageous embodiment of the present invention provides the following feature:

3.1 the constant current pulse (KSI) is selected in the 0.1 ms duration range at a line frequency of 50 Hz.

This ensures that parasitic voltage peaks are not erroneously used for error analysis.

Another advantageous embodiment of the present invention provides the following features:

4.1 the electronic tripping device is monitored consecutively by phase;

4.2 the electronic tripping device is monitored with a time interval of approximately 10 seconds.

Thus it is ensured that the operability of the current transformer is continuously monitored and, in the case of a fault, the low-voltage switch is tripped in a timely manner.

Another advantageous embodiment of the present invention includes the following feature:

5.1 The test current is sent directly to another electronic tripping device to trigger the line tripping contacts, so that the test current—used in conventional transformers—causes the isolation of the lines to be monitored from the supply system even without direct testing of the transformer.

BRIEF DESCRIPTION OF THE DRAWINGS

The FIGURE illustrates a circuit arrangement in accordance with an exemplary embodiment of the present invention.

DETAILED DESCRIPTION

In an example embodiment of the present invention the lines to be monitored, L1, L2, L3, which are isolated from the actual power supply system by tripping contacts NAK in the case of a fault caused by overcurrents, are illustrated in the FIGURE. The tripping contacts are actuated by tripping magnet ALM, which in turn can be triggered by microprocessor device MPE in the case of a fault. Microprocessor device MPE has a zero crossing comparator NDK, which generates an enable signal FGS at zero crossing by the alternate current This enable signal FGS is supplied to downstream constant current source KSQ with the result that a constant current pulse KSI of a certain magnitude generates test current PST in electronic tripping device EAE via additional current transformer winding SWZ and secondary current transformer winding SWG. This test current PST provides information on the electrical conditions of the current transformer being monitored. Test current PST thus formed is then compared with a setpoint value representing the regular data of the current transformer and, if there is a small allowable deviation, causes a (re)calibration of the electronic tripping device to be performed. If the deviation of the test current from the setpoint value exceeds a value that is no longer allowable, tripping magnet ALM is activated by microprocessor device MPE and lines L1, L2, L3 being monitored are isolated from the power supply system by tripping contacts NAK. At the same time, an alarm signal ALS as a visual and/or audio identifier of this state is transmitted by microprocessor device MPE to the control room, for example.

Constant current pulse KSI can also be supplied to a conventional current transformer in a manner not illustrated, and it can thus contribute to the isolation of the lines being monitored from the power supply system. In this case, however, the current transformer itself is not monitored.

What is claimed is:

1. A circuit arrangement for monitoring an electronic tripping device for a low-voltage switch, the electronic tripping device protecting a line from a power supply via a line tripping contact, comprising:

a microprocessor device of the electronic tripping device including a zero crossing comparator, the zero crossing comparator generating an enable signal at zero crossings of alternating current on the lines to be protected; and a switchable constant current source receiving the enable signal and generating a constant current pulse in response to receiving the enable signal, the constant current pulse inducing an evaluatable test current in the electronic tripping device via a current transformer winding, an analog to digital converter converting the evaluatable test current for amplitude measurement;

wherein the microprocessor device is configured to calibrate the electronic tripping device when the evaluatable test current deviates from a predetermined level within a predetermined tolerance, and the microprocessor device is configured to generate an alarm signal to actuate the line tripping contact when the evaluatable test current deviates from the predetermined level by more than the predetermined tolerance.

2. The circuit arrangement according to claim 1, wherein the current transformer winding is electrically coupled to a secondary current transformer.

3. The circuit arrangement according to claim 1, wherein the constant current pulse is in the 0.1 ms duration range at a line frequency of 50 Hz.

4. The circuit arrangement according to claim 1, wherein the electronic tripping device is monitored consecutively by phase, and is further monitored with a timer interval of approximately 10 seconds.

5. The circuit arrangement according to claim 1, wherein the evaluatable test current is sent directly to another electronic tripping device to trigger the line tripping contact.

* * * * *